United States Patent [19]

Grove et al.

[11] Patent Number: 4,726,896

[45] Date of Patent: Feb. 23, 1988

[54] METHOD AND APPARATUS FOR ON-STREAM ANALYSIS OF SLURRIED ORE

[75] Inventors: Richard D. Grove; Ronald L. Wiegel, both of Lakeland, Fla.

[73] Assignee: International Minerals & Chemical Corp., Terre Haute, Ind.

[21] Appl. No.: 23,698

[22] Filed: Mar. 9, 1987

[51] Int. Cl.$^4$ .................. B03D 1/02; B01D 1/00; G05D 11/00; G01F 1/74

[52] U.S. Cl. .................. 209/166; 209/1; 209/168; 210/96.1; 210/105; 137/4; 137/91; 436/55; 436/73; 436/182; 73/61 R; 73/861.04

[58] Field of Search .................. 209/1, 164, 162, 166, 209/167, 168; 137/4, 91, 92, 93; 210/96.1, 105, 742; 73/61 R, 861.04; 436/55, 73, 182

[56] References Cited

U.S. PATENT DOCUMENTS

| | | | |
|---|---|---|---|
| 2,959,053 | 11/1960 | Klein | 73/194 |
| 2,995,030 | 8/1961 | Feigley | 73/61 R |
| 3,551,897 | 12/1970 | Cooper | 209/166 |
| 3,580,072 | 5/1971 | Cox et al. | 73/205 |
| 3,677,406 | 7/1972 | King | 210/740 |
| 3,678,257 | 7/1972 | Lilley et al. | 235/151.34 |
| 3,776,033 | 12/1973 | Herzl | |
| 3,777,127 | 12/1973 | Goetchius et al. | 235/151.3 |
| 3,860,513 | 1/1975 | Hart | 209/166 |
| 3,870,465 | 3/1975 | Marechal | 23/230 A |
| 3,926,050 | 12/1975 | Turner et al. | 73/205 D |
| 4,010,645 | 3/1977 | Herzl | |
| 4,045,657 | 8/1977 | Falke | 235/151.1 |
| 4,048,854 | 9/1977 | Herzl | 73/194 VS |
| 4,226,714 | 10/1980 | Furness | |
| 4,261,196 | 4/1981 | Scheid, Jr. | 73/32 R |
| 4,283,201 | 8/1981 | DeFord et al. | 23/230 A |
| 4,311,488 | 1/1982 | Verschuur | 44/10 R |
| 4,349,884 | 9/1982 | Ganster et al. | 364/557 |
| 4,358,827 | 11/1982 | Abbott | 364/500 |
| 4,390,957 | 6/1983 | Skarlos et al. | 364/550 |
| 4,445,526 | 5/1984 | Woestman | 137/3 |
| 4,450,574 | 5/1984 | Schwartz | 377/2 |
| 4,494,209 | 1/1985 | Agarwal | 364/502 |
| 4,506,541 | 3/1985 | Cunningham | 73/32 R |
| 4,518,699 | 5/1985 | Bohl | 436/49 |

FOREIGN PATENT DOCUMENTS

| | | | |
|---|---|---|---|
| 770548 | 10/1980 | U.S.S.R. | 209/166 |
| 1071316 | 8/1982 | U.S.S.R. | 209/166 |
| 973167 | 11/1982 | U.S.S.R. | 209/166 |
| 1169752 | 7/1985 | U.S.S.R. | 209/166 |

*Primary Examiner*—S. Leon Bashore
*Assistant Examiner*—Thomas M. Lithgow
*Attorney, Agent, or Firm*—Wendell R. Guffey

[57] ABSTRACT

An on-stream method and apparatus for measuring the content of a mineral constituent in a flowing slurried ore on a dry weight basis, is provided. The slurry density and flow rate, and optionally temperature, are measured to calculate a period of time during which the flowing slurry is diverted into a vessel in order to collect a target mass of ore solids therein. The time period is preferably calculated according to the following formula:

$$t = \frac{M_{solid}}{Q_{slurry}} * \frac{1/\rho_{water} - 1/\rho_{solid}}{1/\rho_{water} - 1/\rho_{slurry}}$$

wherein:

t is the period of time (sec);
$M_{solid}$ is the selected target mass of the ore (g);
$Q_{slurry}$ is the measured mass flow rate of the slurry (g/sec);
$\rho_{water}$ is the density of water (g/cm$^3$);
$\rho_{slurry}$ is the measured density of the slurry (g/cm$^3$); and
$\rho_{solid}$ is the known density of the ore solids contained in the slurry (g/cm$^3$).

The slurry flow is then diverted into the vessel for the duration of the calculated time period. During the diverting, the slurry density, flow rate, and optionally temperature are remeasured to calculate the actual mass of ore solids diverted into the vessel. The mineral constituent of the ore solids is then analyzed and determined as a percentage of the diverted slurry solids. The measurement method has particular utility in controlling froth flotation beneficiation processes.

12 Claims, 8 Drawing Figures

METHOD AND APPARATUS FOR ON-STREAM ANALYSIS OF SLURRIED ORE

BACKGROUND OF THE INVENTION

1. Field of the Invention

The present invention is directed to a method and apparatus for measuring the mineral content of an ore slurry. More particularly, the present invention is directed to an on-stream method and apparatus for measuring, on a dry-weight basis, the mineral content of an aqueous ore slurry.

2. Description of the Prior Art

The conveyance of mined ores, by pumping an aqueous ore slurry through a pipeline, is widely practiced. For instance, when phosphate ore is mined from underground or surface mines, the latter initially involving the use of large drag line excavators which remove the overburden and then recover the crude phosphate ore which is known as "matrix", the matrix then being washed by hydraulic jets in an improvised sump pit, the resulting mixture of phosphate ore, water, sand and gravel, called the "slurry", is pumped by pipeline to a washing plant. In the washer, the slurry is pumped over a series of screens interspersed with log washers which act to break up clay balls and other large pieces in the matrix. Usually, there are three streams exiting the washer. All of these streams are also in the form of aqueous ore slurries. One is phosphate pebble product stream typically having a BPL of about 65% (The phosphate content of phosphate ore can be expressed in either of two ways. One is the percentage of bone phosphate of lime or "BPL", which is tricalcium phosphate, $Ca_3(PO_4)_2$. The second manner of expressing phosphate content is in terms of phosphorus pentoxide, $P_2O_5$. The ratio of BPL content to $P_2O_5$ content is about 2.18 to 1.0) and a particle size within the range of about 1 millimeter to about ¾ inch (+16 mesh). A second stream containing both phosphate values and insoluble siliceous minerals or gangue (i.e., sand) has an intermediate particle size range between about 0.1 and 1 millimeter (−16 mesh to +150 mesh). The third stream comprises clay slimes having a particle size below about 0.1 millimeter (−150 mesh). The slimes are typically discarded into a slime pond where the clay eventually settles. Of these three product streams, only the second is subjected to further processing.

In a conventional phosphate ore processing operation, the second stream is fed to a sizing apparatus which typically divides the phosphate and siliceous mineral containing fraction into three distinct particle size ranges. The finest of these three streams has a particle size range of about 0.1–0.4 millimeters (−35 mesh to +150 mesh). This stream is conditioned and then subjected to froth flotation benefication. Froth floation is beneficiation process whereby a particulate ore is slurried in an aqueous medium to form a pulp through which a gas, such as air, is sparged. One or more components of the ore is thereby selectively caused to rise to the surface of the slurry in a frothing chamber while the chamber is sparged with the gas. The particles are caught in the froth formed on the surface of the slurry in the chamber and are removed with the froth while particles that do not rise remain in the slurry and are drawn off through the bottom of the flotation chamber. In conventional froth flotation equipment, air or other gaseous medium is sparged through a tank containing an aqueous pulp of comminuted ore, frothing agents, collecting reagents and other frothing aids. The fine stream is subjected to froth flotation using for example well-known anionic fatty acid collecting reagents wherein fine rough siliceous tailings are removed (and wasted) and a fine rough phosphate concentrate is collected in the froth.

The intermediate particle size stream coming from the sizing apparatus has a particle size range of about 0.4–0.7 millimeters (−24 mesh to +35 mesh) and is fed to a coarse flotation unit which also uses conventional anionic fatty acid collecting reagents. In the coarse rough flotation, a coarse rough tailing is removed and wasted, and a coarse rough phosphate concentrate is collected in the froth and can be combined with the fine rough concentrate mentioned earlier.

The combined streams of the fine rough concentrate and the coarse rough concentrate then generally are sent to an acid (typically $H_2SO_4$) scrubbing unit to remove the fatty acid and other reagents. The acid scrubbed slurry then is washed with water and sent to a cationic (amine) flotation unit. Before the cationic flotation, the feed slurry is conditioned with a flotation reagent typically comprising a mixture of an amine and kerosene.

The third stream exiting from the sizing apparatus comprises particles having a very coarse particle size in the range of about 0.7–1.0 millimeters (−16 mesh to +24 mesh). The stream is usually beneficiated by a combination of chemical conditioning and mechanical separation techniques using a skin flotation device such as a spiral separator, a belt separator, a concentrating table or the like. Normally, this stream is chemically conditioned at a high solids concentration with a conventional anionic conditioning reagent such as a mixture of a fatty acid reagent, such as tall oil, and a fuel oil extender. The conditioning reagent may also include ammonia or caustic for pH control. The stream then is fed to the skin flotation device which comprises a series of downwardly sloping spiral troughs having a number of side exits ports in the trough along the inner edge thereof. The heavier siliceous materials contained in the slurry tend toward the inside of the spiral trough while the lighter reagentized phosphate materials (with attached air bubbles) tend toward the outside. The inside exit ports are positioned to accomplish separation of the heavier siliceous materials. The spiral tails containing the siliceous minerals are then sent to a scavenger flotation cell wherein residual phosphate values are foamed to the top, while the heavier siliceous minerals are wasted from the bottom of the cell.

The spiral concentrate streams and the scavenger flotation cell streams generally then are combined to produce another stream typically having a BPL value of about 68% and an insoluble fraction of about 8–12%.

In the beneficiation of mineral slurries, such as phosphate ore slurries, it is extremely advantageous to know the precise mineral content of the solids contained in the slurry. For example, in the beneficiation of phosphate containing ore, it is desirable to know the phosphate content of the ore on a dry weight basis. This information is especially desirable in monitoring the froth flotation beneficiation of ore slurries, such as in the fine flotation, the coarse flotation and the scavenger flotation of phosphate ores mentioned above. The reason for this is that collecting reagents represent a significant part of the cost of ore beneficiation by froth flotation and the optimum amount of collecting reagent added to the slurry is dependent upon the amount of phosphate, on a dry weight basis, contained in the slurried ore. The amount of collecting reagent added is generally a function of the BPL content of the solids of one or more of the flotation feed and exit streams. In order to optimize the amount of collecting reagent added to a froth flotation cell in the beneficiation of phosphate ore, the percent BPL or percent insolubles contained in either the flotation concentrate or tails streams should preferably be determined as precisely as possible.

To date, two methods for controlling froth flotation ore beneficiation processes have been used. First, samples of the flotation exit streams (both the flotation concentrate stream and the flotation tail stream) are periodically taken and sent to an on-site laboratory to determine the weight ratio of phosphate to sand in the solids portion of the slurry. This type of chemical analysis typically requires a minimum of about two hours, during which the sample is first dewatered and then completely dried in an oven and then digested using hydrochloric and nitric acids at high temperatures in order to determine the phosphate content of the solids contained in the slurry sample. The major portion of this analysis time is spent in dewatering the slurry sample and drying the solids. Because the analysis takes a minimum of about two hours, the slurry samples are "composite samples" comprising an average of the flotation exit stream over the sampling period with small samples being taken about every few minutes. In the froth flotation beneficiation of phosphate ores, the laboratory analysis gives an average value of the phosphate content of the solids contained in the slurry over the sampling period.

Secondly, the flotation operator takes instantaneous samples from the flotation feed and exit streams and makes a rough visual estimate of the sand and/or phosphate content of the sample. In the beneficiation of phosphate ores, phosphate rock has a highly variable color and appearance, ranging from almost pure white to a dark grayish color. In other cases, the phosphate rock can have an appearance quite close to that of the sand. Accordingly, control of the flotation process based upon the operator's visual inspection of the flotation feed, concentrate and tail samples inherently involves a great deal of guess work. Under the best of conditions, an experienced phosphate flotation cell operator can only "see" differences in the percent BPL of a flotation tail slurry (and differences in the percent acid-insoluble solids of a flotation concentrate slurry) on the order of about 2% or more.

It is accordingly an object of the present invention to provide an on-stream method and apparatus for quickly and accurately measuring the content of a mineral contained in a slurried ore, on a dry weight basis.

It is another object of the invention to provide a method and apparatus for quickly and accurately determining the mineral content of a slurried ore, on a dry weight basis, in order to improve mineral recovery and to provide more effective control of the processing of the ore, such as assuring optimum reagent use in a froth flotation process.

It is a more specific object of the present invention to provide an on-stream method and apparatus permitting automated control of a froth flotation process, particularly in the froth flotation of phosphate ores, which does not rely on the subjective evaluation by an operator of froth flotation feed and/or exit streams nor on the time-consuming dewatering, drying and chemical analysis used in the past.

SUMMARY OF THE INVENTION

These and other important objects of the present invention are provided by a method and apparatus for performing an on-stream measurement of the content of a mineral constituent in an ore on a dry weight basis, the ore being in the form of a flowing aqueous slurry. The method comprises selecting a target mass of ore solids to be collected and analyzed. The density and flow rate of the slurry are measured and the time period necessary to divert the slurry flow into a vessel to collect the target mass of ore therein is calculated. The slurry flow is then diverted into the vessel for the duration of the calculated time period. The flow rate and density of the diverted slurry are measured during the diverting and the mass of ore solids actually collected in the vessel is calculated. The mineral constituent content of the collected ore solids is then analyzed and the mineral constituent content is determined as a percentage of the collected mass of ore solids.

In a preferred embodiment of the invention, the time period for diverting the slurry flow into the vessel is calculated according to the following formula:

$$t = \frac{M_{solid}}{Q_{slurry}} * \frac{1/\rho_{water} - 1/\rho_{solid}}{1/\rho_{water} - 1/\rho_{slurry}}$$

wherein:

t is the period of time (sec);

$M_{solid}$ is the selected target mass of ore (g);

$Q_{slurry}$ is the mass flow rate of the slurry measured before the diverting (g/sec);

$P_{water}$ is the density of water (g/cm$^3$);

$P_{slurry}$ is the density of the collected slurry measured before the diverting (g/cm$^3$); and $P_{solid}$ is the known density of the ore solids (g/cm$^3$).

Preferably the temperature of the slurry is also measured so that an appropriate correction can be made for the density of water therein.

More particularly, the present invention comprises a method and apparatus for controlling the beneficiation of a mineral constituent of an ore, such as the phosphate constituent of a phosphate ore, in a froth flotation process. During froth flotation an aqueous pulp containing the ore and a flotation reagent is sparged with a gas, typically air. The amount of flotation reagent added to the pulp is controlled based on the measured mineral constituent content of an aqueous ore slurry exiting the froth flotation process. A target mass of ore solids to be collected and analyzed is selected. The density and flow rate of the slurry are then measured and the time period necessary to divert the slurry flow into a vessel in order to collect the selected target mass of ore therein is calculated. The slurry flow is then diverted into the vessel for the duration of the calculated time period. The flow rate and density of the diverted slurry are measured during the diverting and the mass of ore solids actually collected in the vessel is calculated. The mineral constituent content of the collected ore solids is then analyzed and the mineral constituent content is determined as a percentage of the collected mass of ore solids. The amount of flotation reagent added to the aqueous pulp is then adjusted in response to the determined percentage.

In a preferred embodiment of the invention, the time period for diverting the slurry flow into the vessel is calculated according to the following formula:

$$t = \frac{M_{solid}}{Q_{slurry}} * \frac{1/p_{water} - 1/p_{solid}}{1/p_{water} - 1/p_{slurry}}$$

wherein:
t is the period of time (sec);
$M_{solid}$ is the selected target mass of ore (g);
$Q_{slurry}$ is the mass flow rate of slurry measured before the diverting (g/sec);
$P_{water}$ is the density of water (g/cm$^3$);
$P_{slurry}$ is the density of the collected slurry measured before the diverting (g/cm$^3$); and
$P_{solid}$ is the known density of the collected solids (g/cm$^3$).

Preferably the temperature of the slurry is also measured so an appropriate correction can be made for the density of water therein.

DETAILED DESCRIPTION OF THE INVENTION

The present invention concerns a method and apparatus for measuring the content of a mineral constituent of an ore on a dry weight basis, wherein the ore is in the form of an aqueous slurry. The invention has particular utility in controlling the froth flotation beneficiation of an ore. Conventional phosphate ore processing includes several froth flotation beneficiation processes including (1) anionic flotation processes in which the ore is conditioned and floated with an anionic collector such as a fatty acid or tall oil and the phosphate mineral constituent is floated and collected as a froth concentrate stream while the sand (silica) remains in the aqueous phase and is removed in the tail stream; (2) cationic flotation processes utilizing a cationic amine reagent where the phosphate mineral constituent remains in the aqueous concentrate phase while the silica impurities are floated and removed in the froth phase, and others.

The present invention provides a method and apparatus for quickly and accurately measuring the content of a mineral constituent in a selected target mass of ore on a dry weight basis wherein the ore is present as an aqueous slurry. The invention has particular utility in determining the content of a mineral constituent selected target mass of ore, on a dry weight basis, wherein the aqueous slurry is a froth flotation concentrate stream or a froth flotation tail stream.

The selection of the froth flotation equipment and the types and levels of use of flotation reagents form no part of the present invention and details can be obtained, for example, from pages 1085–1091 of the *Chemical Engineer's Handbook*, Third Edition, McGraw-Hill Book Company (1950), as well as in U.S. Pat. Nos. 2,914,173; 2,970,688; 4,144,969; and 4,364,824; the disclosures of which are incorporated herein by reference.

Figure 1:
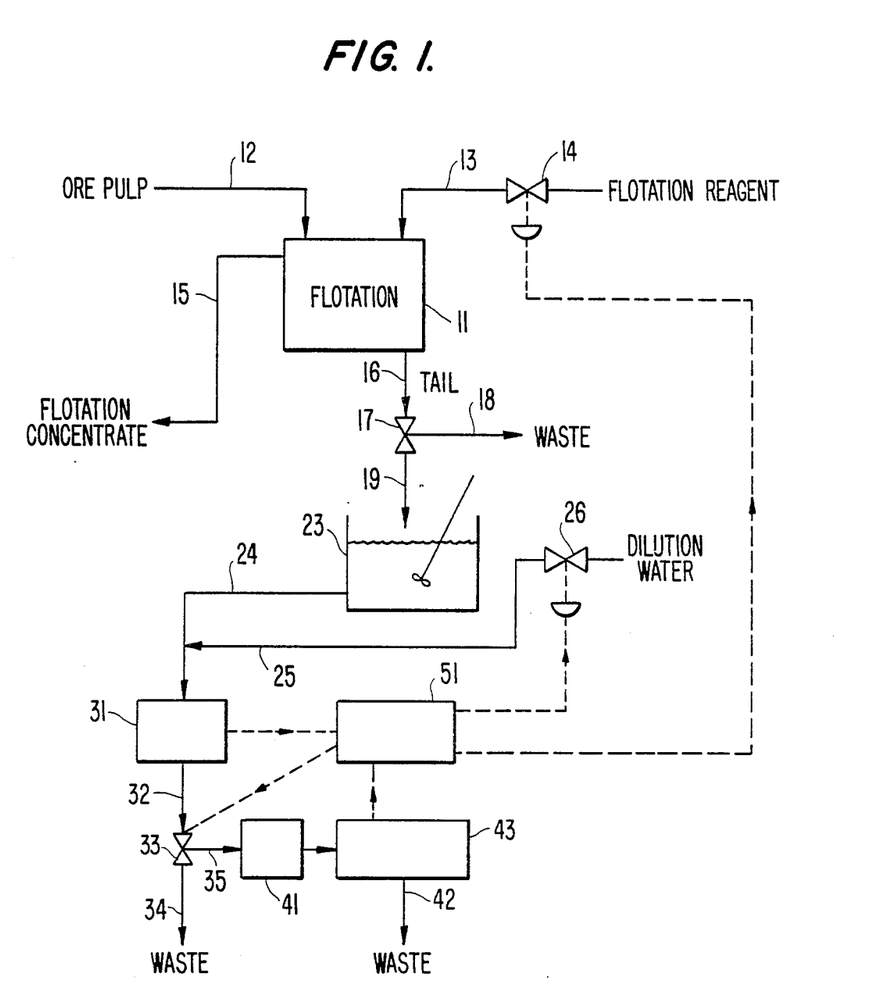
FIG. 1 is a schematic process flow diagram of an embodiment of the present invention for determining the percent BPL, on a dry weight basis, of a froth flotation tail slurry stream.

FIG. 1 illustrates one embodiment of the present invention wherein the percent BPL of a phosphate ore froth flotation tail stream is measured and the amount of flotation reagent added to the flotation cell is adjusted in response thereto. Referring to FIG. 1, an ore pulp stream 12 and a flotation reagent stream 13 are fed to a flotation cell 11 where the ore slurry is first conditioned and then sparged with air (not shown). The particular flotation cell illustrated in the figure is an anionic flotation cell comprising the first stage in a conventional two stage flotation of phosphate ore. Accordingly, the flotation reagent fed through stream 13 comprises an anionic reagent such as a fatty acid or tall oil. The sparging of the ore pulp with air selectively floats the phosphate mineral in the froth phase at the top of flotation cell 11 while the silica component remains in the aqueous phase and is removed in flotation tail stream 16. The froth, containing the beneficiated phosphate mineral, is collected and removed in flotation concentrate stream 15.

In conventional anionic flotation processes, the tail stream 16 is wasted. However, in practicing the present invention, tail stream 16 is periodically sampled in order to measure the amount of phosphate, on a dry weight basis, being discarded. The measured level of discarded phosphate is then used to adjust the rate of addition of flotation reagent to cell 11, thereby optimizing reagent use. To accomplish this measurement a stream splitter 17 is provided which continuously or periodically diverts the tail slurry flowing in stream 16 to sample stream 19 leading to mixing vessel 23. The remaining portion of the tail slurry is wasted through stream 18. Collection of the slurry sample from stream 16 may be performed using any number of known sampling techniques and suitable sampling valves.

The slurry sample stream 19 is either continuously or periodically diverted from tail stream 16. In cases where device 31 (which measures slurry density and flow rate as will be described in more detail hereinafter) is calibrated for slurries having a solids fraction within a specified range, it may be necessary to dewater the slurry sample using, for example, a hydrocyclone (not shown), or dilute the sample before feeding to mixing vessel 23.

The slurry is preferably kept well-mixed in vessel 23. Mixing vessel 23, although not essential for practicing the present invention, is a highly preferred component of this embodiment of the invention. Because the slurry is retained in mixing vessel 23 for a specified residence time, the slurry composition therein represents an average value over the residence time in the mixing vessel 23, instead of an instantaneous value of the composition of the slurry flowing in stream 16. The average residence time of the slurry in vessel 23 preferably approximates the time required to determine the content of the mineral constituent of the slurried ore, on a dry weight basis, according to the method described hereinafter.

Mixer exit stream 24 feeds the slurry to measuring device 31. Device 31 measures slurry density, slurry flow rate (either mass flow rate or volumetric flow rate) and optionally measures the temperature of the slurry. A preferred device for measuring the flow rate, density and temperature of the slurry is a MICRO MOTION meter, Model D, solid by Micro Motion, Inc. of Boulder, Colo. The flow rate and density of the slurry flowing in stream 24 is continuously monitored by device 31 and the measured values are continuously sent to control system 51. Control system 51 includes a conventional microprocessor or similar computing device to manipulate the information obtained from device 31. In cases where device 31 is calibrated for slurry densities of a specified range, control system 51 also regulates the slurry density in stream 24 by modulating the flow rate of dilution water through flow control valve 26 and stream 25 using conventional feedback control techniques, to ensure that the density of the slurry measured by device 31 is within its range of calibration. While the addition of dilution water into the slurry flowing through stream 24 effects the slurry density, which in turn effects the calculation of the time period during which the slurry is diverted into digestor 41, those skilled in the art will appreciate that the effects of dilution or dewatering of the slurry flowing through stream 24 may be easily compensated for, as shown in the examples herein.

Normally, when valve 33 is not activated, the slurry flowing through stream 32 passes through stream 34 and is wasted. However, when valve 33 is actuated, the slurry flowing in stream 32 is diverted into digestor 41, through stream 35.

The time period (t) needed to deliver a selected target mass of ore solids to digestor 41 is calculated by system 51 from the measured slurry density and flow rate, and optionally, the slurry temperature. Control system 51 then activates valve 33 for the duration of the calculated time period, thereby diverting a quantity of the slurry flowing in stream 32 through stream 35 and into digestor 41.

Control system 51 conventionally includes a feedback controller and a current to pneumatic transducer. A preferred feedback controller is model 53MC1100 sold by Fisher Porter Company of Warminster, Pa. A suitable current to pneumatic transducer is model E69F sold by Foxboro Company of Foxboro, Mass. A suitable control valve 26 is the pneumatically actuated Mark 70 valve sold by Jordan Valve Company of Cincinnati, Ohio.

During the time when valve 33 is activated and is diverting the slurry from stream 32 into digestor 41, device 31 again measures the slurry density and flow rate, and optionally the slurry temperature. These measurements are then used to calculate the mass of ore solids actually collected in digestor 41.

First, the solids weight fraction of the slurry is calculated from the known densities of the ore solids and water and from the measured slurry density, as follows:

$$F_{solids} = \frac{1/\rho_{water} - 1/\rho_{slurry}}{1/\rho_{water} - 1/\rho_{solids}}$$

where:
$F_{solids}$ is the solids fraction of the slurry;
$P_{solids}$ is the known density of the collected solids (g/cm$^3$) (in the case of froth flotation of a phosphate ore, the ore solids contained in a flotation tail stream typically have a density of about 2.7 g/cm$^3$), while the ore solids contained in a flotation concentrate stream typically have a density of about 3.0 g/cm$^3$);
$P_{slurry}$ is the density of the collected slurry (g/cm$^3$) measured by device 31 while valve 33 is activated; and
$P_{water}$ is the density of water (g/cm$^3$), preferably with a correction for water temperature.

The mass of ore solids actually delivered to digestor 41 may be calculated using the following equation:

$$M_{actsolid} = Q_{slurry} * F_{solids} * t$$

where:
$M_{actsolid}$ is the mass of ore solids actually delivered to digestor 41 while valve 33 is activated (g);
$F_{solids}$ is the solids fraction of the slurry, as calculated above; and
$Q_{slurry}$ is the slurry mass flow rate (g/sec) measured by device 31 while valve 33 is activated; and
t is the period of time during which valve 33 is activated.

In cases where device 31 measures the volumetric flow rate of the slurry, then the mass flow rate of the solids in the slurry may be calculated using the following equation:

$$M_{actsolid} = Q_{vol} * P_{slurry} * F_{solids} * t$$

where:
$M_{actsolid}$ is the mass of ore solids actually delivered to digestor 41 while valve 33 was activated (g);
$Q_{vol}$ is the volumetric flow rate of the slurry (cm$^3$/sec) measured by device 31 while valve 33 was activated;
$P_{slurry}$ is the density of the slurry (g/cm$^3$) measured by device 31 while valve 33 was activated;

$F_{solids}$ is the solids fraction of the slurry, as calculated above; and t is the period of time during which valve 33 was activated.

Valve 33 is preferably a high precision fast acting valve which is capable of quickly diverting the slurry flowing through stream 34 into analysis stream 35. One suitable valve is the Series 2600 Miniflex valve sold by Red Valve, Inc. of Carnegie, Pa. When this type of valve is actuated, all of the slurry passing through stream 32 is diverted to degester 41 through stream 35.

The selected target mass for a typical phosphate ore may be on the order of about 50 grams although those skilled in the art will readily appreciate that the selected target mass need not be any particular value. The size of the target mass is generally dependent on the type of digester 41 used as well as the specific mineral and ore being analyzed.

The method of the present invention is superior to other known systems which simply open a sampling valve for a constant time period, because it avoids the inaccuracies inherent in such systems. Here, the time period is calculated so as to deliver the selected target mass of ore solids to digestor 41.

The content of the mineral constituent of the slurried ore is now analyzed. The particular analysis method used will depend on the type of ore and the particular mineral constituent being analyzed. In the embodiment described hereinbelow, the phosphate (i.e., % BPL) content of a phosphate ore is measured.

The phosphates in a phosphate ore may be solubilized by digesting the ore solids in a strong acid and thereafter chemically analyzing the acid digestion products to determine dissolved phosphate content. The acid used for digestion is preferably nitric acid which is less corrosive to the digestion hardware.

In digestor 41, the slurry sample is mixed with a known excess quantity of concentrated nitric acid. A sufficient amount of acid is used to completely digest the acid-soluble phosphate constituent of the slurry solids. The digestion products are then analyzed, for example, by a flow injection analysis (FIA) system 43, in order to determine the amount of dissolved phosphate contained therein. This analysis in turn is used to determine the percent BPL of the original slurry, on a dry weight basis.

One example of a suitable FIA system employs a colorimetric procedure to measure the amount of dissolved phosphate in the digestion products. According to this procedure a coloring reagent which is specific to phosphate, such as ammonium vanadomolybdate, is pumped through an injector valve (not shown) such as the model C 14W sold by Valco Instruments Company of Houston, Tex., or similar device. The operation of the FIA injection valve and other system components can be controlled by a Series One Programmable Controller sold by General Electric Company of Charlottesville, Va. Other programmable controllers can also be used. The injector valve injects a known and repeatable volume of digestion products into the flowing color reagent stream. The digestion products and color reagent react to form a characteristic color with intensity dependent on (1) the amount of dissolved phosphate in the digestion products, (2) the volume of sample injected and (3) the elapsed time from the injection as outlined in section 4.1.1 of *Flow Injection Analysis*, John Wiley and Sons, New York, 1981. This mixture flows through a flow cell illuminated at one end by an approximately monochromatic light source. The light source wavelength is chosen so that a variable opacity ligh filter is formed when the colored mixture passes through the flow cell. A photovoltaic device senses the intensity of light passing through the flow cell and converts this measure to an electrical signal. A suitable flow cell, light source, detector and associated electronic package is sold by Lachat Instruments of Mequon, Wis. and others.

Another suitable technique for measuring the dissolved phosphate content of the digestion products includes Continuous Flow Analysis sold by Technicon Industrial Systems of Tarrytown, N.Y. The particular measurement technique chosen will be influenced to a large degree on the characteristics of the sample stream being examined and the present invention is not limited to the described acid digestion-colorimetric technique.

The information gathered from the FIA system 43 is sent to an integrator (not shown) where it is converted to digital form for transmission to the microprocessor in control system 51. One suitable integrator is the model 3392A sold by Hewlett Packard, of Palo Alto, Calif. The microprocessor compares the information gathered from system 43 with values obtained from standard reference solutions having known dissolved phosphate contents, and by interpolating between these values to determine the dissolved phosphate content of the digested solutions.

The microprocessor in control system 51 uses the dissolved phosphate content to calculate the percent BPL in the digested product as follows:

$$\% \; BPL = \frac{DP * V * 100}{M_{actsolid} * k}$$

where:

% BPL is the bone phosphate of lime content of the slurried ore flowing in tail stream 16, on a dry weight basis (%);

DP is the measured dissolved phosphate content in the digestion products (mg of BPL/1);

V is the volume of liquid (acid and water from the slurry) delivered to digestor 41 (ml);

$M_{actsolid}$ is the mass of solids in the slurry sample delivered to digestor 41 (g); and k is a units conversion constant equal to $$\left( \frac{1000 \; mg}{g} * \frac{1000 \; ml}{l} \right) .$$

The calculated percent BPL of the slurry in tail stream 16 can be used to regulate the flow of reagent into flotation cell 11 through valve 14. The percent BPL contained in the anionic flotation tail stream 16 is a direct indication of the loss of phosphate mineral to waste. It is economically advantageous to control these losses at acceptably low levels without using excessive quantities of fatty acid flotation reagent. To do this, the BPL content of tail stream 16 measured by the on-stream analysis system is compared to a set point, for example 2% BPL, which is a predetermined acceptably low level for phosphate losses. The set point is fixed by a number of considerations including the value of the discarded phosphate mineral as well as the flotation reagent cost. The difference between the set point and the measured BPL represents an error to be corrected by a resultant change in the rate of fatty acid flotation reagent addition as achieved by a feed back control loop. A measurement below set point results in a decrease in the fatty acid addition rate while a measurement above set point results in an increase in fatty acid addition rate.

As those skilled in the art will appreciate, the magnitude and the duration of the change is determined by many factors including the flotation characteristics of the material being processed, the dynamics of the flotation process, the on-stream analysis measurement system and the feed back control loop.

The feed back control loop consists of a controller (in this case a computer) to which the set point has been inputed by an operator. In commercial operations, the set point may be changed several times per day and the on-stream analysis of the BPL content of tail stream 16 may be taken every few minutes. The deviation between the measured BPL content and the set point value is used to calculate the rate of addition of fatty acid reagent to correct this situation. A signal representing this required reagent addition rate is then sent to a reagent flow controller which then opens or closes control valve 14 to permit the delivery of more or less reagent as measured by a reagent flowmeter.

Figure 2:
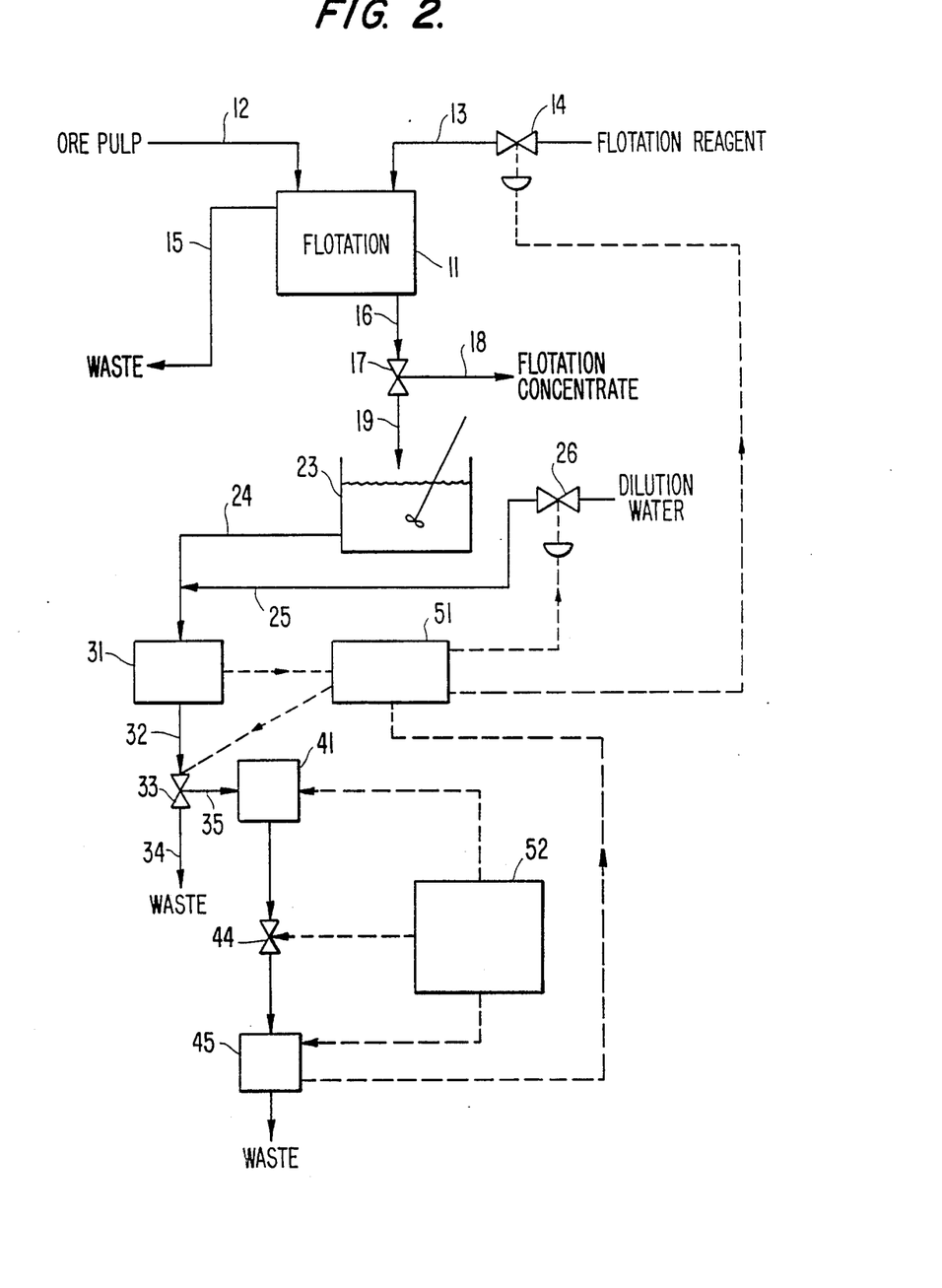
FIG. 2 is a schematic process flow diagram of another embodiment of the present invention for determining the percent acid-insoluble solids, on a dry weight basis, of a froth flotation concentrate slurry stream.

Another embodiment of the invention which is illustrated in FIG. 2 has particular utility in controlling th cationic (amine) flotation of phosphate ore. Most of the apparatus shown in FIG. 2, and the methods of using same, are substantially the same as the apparatus and methods described in FIG. 1. Accordingly, only those elements of the FIG. 2 embodiment which are different from the corresponding elements of the FIG. 1 embodiment will be described hereinafter. In the FIG. 2 embodiment, the flotation process utilizes a cationic amine flotation reagent which is introduced through stream 13. In cationic flotation processes the phosphate mineral constituent remains in the aqueous concentrate phase while the silica is floated in the froth phase and wasted through stream 15. The aqueous concentrate is collected through stream 16. In this embodiment, the acid-insoluble silica content of the selected target mass, rather than the acid-soluble phosphate content of the selected target mass, is determined on a dry weight basis.

One major difference is that the embodiment illustrated in FIG. 2 includes apparatus, down stream from digestor 41, for measuring the silica content of the slurried ore. As in the FIG. 1 embodiment, a portion of stream 32 is sampled by valve 33 and conveyed to acid digester 41 through stream 35. After digestion by the acid in the digestor 41, the acid-insoluble portion of the sample is allowed to settle to the bottom of the digestor. Siphoning removes the bulk of the liquid digestion products from the digestor so that the acid-insoluble solids and only a small amount of liquid remain. A valve 44 is opened and a water spray flushes the liquid and insolubles into a container placed on a scale 45. The acid-insoluble solids are allowed to settle and the liquid level in the container is lowered to a predetermined height. The combined weight of the container with the sample filled to the predetermined height is then recorded. The weight of the acid-insoluble solids is determined by subtracting the weight of the same container filled with water to the same predetermined height from the combined weight of the container and the sample. Taring of the water-filled container is preferably performed automatically by weighing the container filled with water prior to loading the container with the slurry sample. The tared weight can then be automatically subtracted from the measured weight of the container and sample, giving a net weight for the acid-insoluble solids. After the weighing, the sample is wasted. The valve 44 and the scale 45 are preferably operated by a programmable controller 52.

The assumption that the volum of solids and water are additive allows the mass of acid-insoluble solids in the container to be calculated according to the following equation:

$$M_{insol} = \frac{M_{slurry} - (V^* p_{water})}{p_{water}(1/p_{water} - 1/p_{solids})}$$

where:
V* $P_{water}$ is the mass of water in the container when the container is filled to a predetermined height with water;
$M_{insol}$ is the mass of acid-insoluble solids in the slurry sample filled to the predetermined height within the container (g);
$M_{slurry}$ is the mass of the slurry sample filled to the predetermined height in the container (g);
$P_{water}$ is the density of water (g/cm$^3$); and
$P_{solid}$ is the known density of the acid-insoluble solids (in the case of acid digestion of a phosphate ore, the acid-insoluble ore solids (i.e., silica) typically have a density of about 2.65 g/cm$^3$)(g/cm$^3$).

The percent acid-insoluble solids on a dry weight basis can then be calculated simply by dividing $M_{insol}$ by the mass of ore solids ($M_{actsolid}$) delivered to digestor 41 and multiplying the result by 100 and preferably by also multiplying the result by an experimentally determined calibration factor.

The method and apparatus of the present invention is further illustrated by the following examples. The apparatus of FIG. 1 was used to determine percent BPL on a dry weight basis in the examples. The apparatus of FIG. 2 was used to determine percent acid-insoluble solids on a dry weight basis in the examples.

EXAMPLE 1

This example demonstrates the use of the invention to determine the percent BPL on a dry weight basis of a anionic flotation fine tail stream 16 generated from the flotation of a phosphate ore pulp 12 in cell 11. A target mass of 50 g of ore solids was selected for digestor 41 which was filled with 3 liters of one molar nitric acid at 82° C. The slurry mass flow rate ($Q_{slurry}$) and density ($p_{slurry}$) measured by device 31 were, prior to opening valve 33, 2.63 kg/min. and 1.205 g/ml, respectively, and the temperature was 20.92° C. giving a corrected water density of 0.998 g/cm$^3$. The control system 51 calculated that 50 g of ore solids would be delivered to digestor 41 by actuating valve 33 for a period of 4.18 seconds. Accordingly, valve 33 was opened for 4.18 seconds during which time the flowing slurry was diverted into digestor 41. During the 4.18 second time period, device 31 again measured slurry flow rate ($Q_{slurry}$=2.688 kg/min.), density ($p_{slurry}$=1.197 g/cm$^3$) and temperature (20.77° C.; $p_{water}$=0.998 g/cm$^3$). Control system 51 calculated that 187.29 g of slurry and 49.39 g of ore solids were delivered to digestor 41 in stream 35 based on meaurements made by device 31 when valve 33 was opened. Following digestion of the slurry with the acid, a sample of the digestion products was automatically removed from the digestor and subjected to triplicate FIA colorimeter measurements in system 43, giving integrator peak heights. Prior to the digestion, triplicate FIA colorimeter measurements were also made on standard solutions containing 250 mg of BPL/1 and 750 mg of BPL/1 of dissolved phosphate, respectively, to establish a standard reference curve.

| Solution | Dissolved Phosphate Concentration (mg of BPL/1) | Peak heights |
|---|---|---|
| low standard | 250.00 | 1609363, 1612024, 1610499 |
| high standard | 750.00 | 4678670, 4626310, 4631160 |
| digested sample solution | unknown | 3016458, 3011056, 3005366 |

A least squares best fit analysis of the triplicate peak height measurements for the high and low standard solutions was made. The concentration of dissolved phosphate in the sample solution was calculated from its associated average peak height from the least squares equation and found to be 476 mg of BPL/1.

Percent BPL was calculated as follows:

$$\% \ BPL = \frac{DP^* V^* 100}{M_{actsolid}^* k}$$

where:
%  BPL is the bone phosphate of lime content, on a dry weight basis of tail stream 16 (%);
DP is the amount of dissolved phosphate in the digestion products, measured by the FIA system (mg of PBL/1);
V is the volume of liquid (acid and water) in the digestor (ml);
$M_{actsolid}$ is the mass of solids in the slurry sample delivered to digestor 41 (g); and
k is a units conversion constant equal to $$\left( \frac{1000 \ mg}{g} * \frac{1000 \ ml}{l} \right).$$

The percent BPL of tail stream 16 was accordingly calculated to be 3.02% on a dry weight basis.

EXAMPLE 2

This example demonstrates the use of the invention to determine the acid-insoluble solids (i.e., sand) content on a dry weight basis of the solids in a flotation concentrate stream 16 from the cationic froth flotation of a phosphate ore pulp stream 12 in flotation cell 11. The flotation concentrate stream 16 was similarly diverted by a stream splitter 17 to another sample stream 19 leading to another mixing vessel 23. In this way, the flotation concentrate stream was automatically sampled and a portion diverted to a separate digestor for nitric acid digestion during the same time interval that the fine tail stream sampling of Example 1 was being taken and analyzed.

The actual weight of ore solids diverted to the digestor 41 ($M_{actsolid}$) was 48.00 g which was determined by the same technique described in Example 1. The acid-insoluble solids remaining after acid digestion were flushed into a container placed on an electronic scale. The weight of the container filled with water to a predetermined height had first been registered as a tare in the scale and then the container filled to the same height with acid-insoluble solids and water was weighed with the tare automatically subtracted. The overage weight was 0.77 g. The mass of acid-insoluble solids was calculated as follows:

$$M_{insol} = \frac{M_{slurry} - (V^* p_{water})}{p_{water}(1/p_{water} - 1/p_{solids})}$$

where:
$V^* \ P_{water}$ is the mass of the water when the container is filled to a predetermined height with water;
$M_{solid}$ is the mass of acid-insoluble solids in the container (g);
$M_{slurry}$ is the mass of the slurry in the container filled to the predetermined height (g);
$P_{water}$ is the density of water (g/cm$^3$); and
$P_{solid}$ is the known density of the acid-insoluble solids (g/cm$^3$).

In the above formula, ($M_{slurry} - V^* \ p_{water}$) equals the overage weight of the slurry containing the acid-insoluble solids (g). Since $p_{water}$ equals 1.00 g/ml and $p_{solids}$ equals 2.65 g/ml, $M_{insol}$ was calclated to be 1.24 g.

The acid-insoluble solids content of the flotation concentrate on a dry weight basis is then calculated as follows:

$$\% \ INSOL = k(M_{insol}/M_{actsolid})^* 100$$

where:
% INSOL is the acid-insoluble solids content of the flotation concentrate stream on a dry weight basis;
$M_{actsolid}$ is the actual mass of ore solids in the slurry sample delivered to digestor 41 (g); and
k is a calibration factor, determined by experimental results to be equal to 1.19, which relates the on-stream measurement of acid-insoluble solids to the measurement made by routine analytical assays.

The percent acid-insoluble solids contained in the flotation concentrate stream was calculated to be 3.07% on a dry weight basis.

EXAMPLE 3

Figure 3:
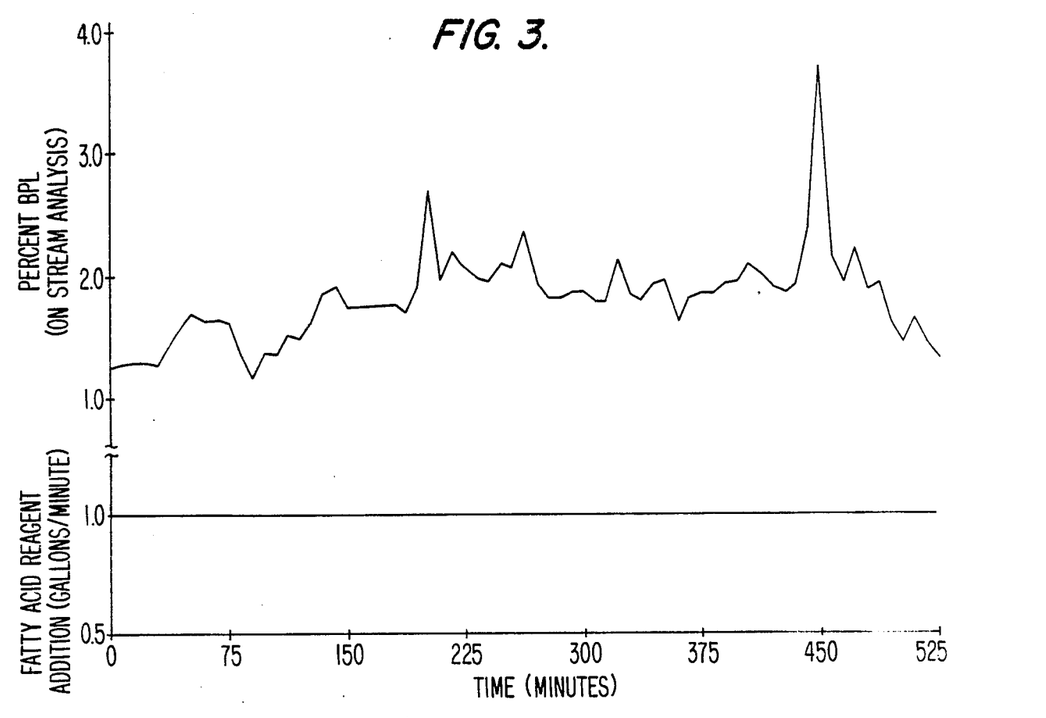
FIG. 3 presents two graphs, the upper graph showing the percent BPL of an anionic flotation fine tail stream over time, as determined by the on-stream measurement method and apparatus of the present invention, and the lower graph showing the rate of addition of fatty acid reagent, under the manual control of a flotation cell operator, over the same time period.

The percent BPL of a flotation fine tail steam was determined, according to the method described in Example 1, every 7.5 minutes over a period of 525 minutes and the results are shown on the upper graph of FIG. 3. During this time period, the rate of fatty acid reagent addition (gallons/minute) to the flotation cell was under the manual control of an operator who was watching the flotation cell and who had access to laboratory assays of % BPL obtained every two hours, but who did not have access to the on-stream analysis of percent BPL in the fine tail stream. The operator, based on his judgment, maintained reagent addition constant at 1.0 gallons/minute (shown on the lower graph of FIG. 3) throughout the entire sampling period.

Figure 4:
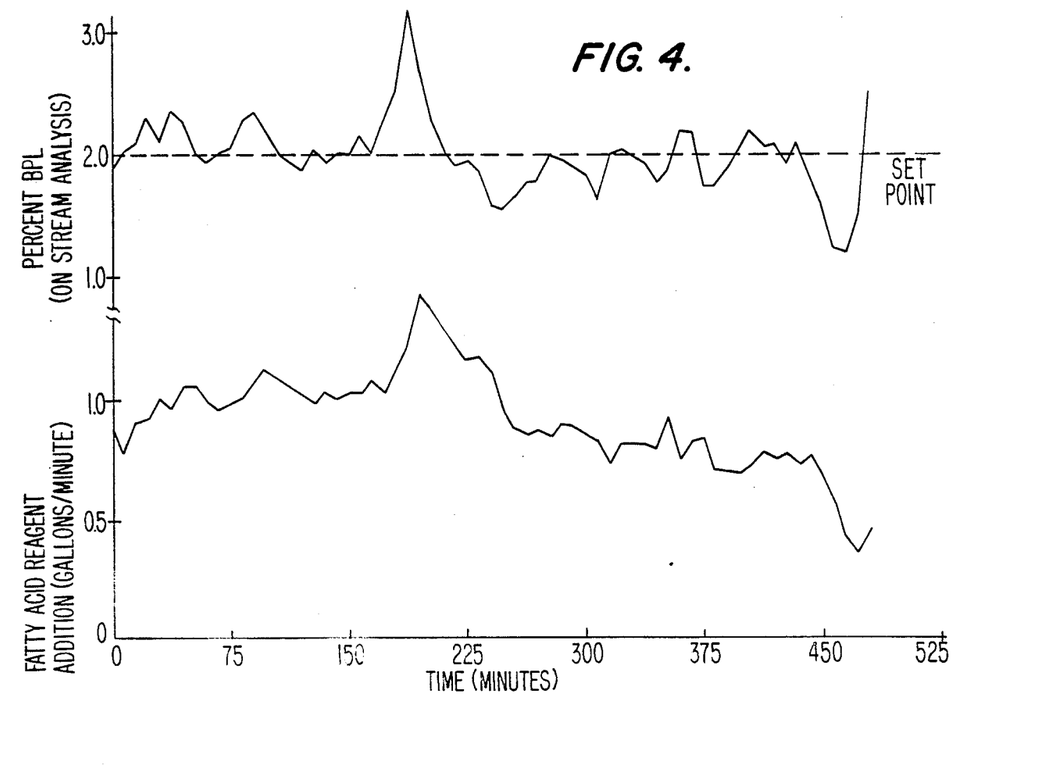
FIG. 4 presents two graphs, the upper graph showing the percent BPL of an anionic flotation fine tail stream over time, as determined by the on-stream measurement method and apparatus of the present invention, and the lower graph showing the rate of addition of fatty acid reagent under control based on a preferred on-stream measurement method of the present invention, over the same time period.

For comparison, there is shown on the upper graph of FIG. 4 the on-stream measurement of the percent BPL of the same fine tail stream, over a different time period. The amount of fatty acid reagent added to the flotation cell was controlled according to the percent BPL measured. Reagent addition rate is shown on the lower graph of FIG. 4.

The percent BPL contained in the anionic flotation tailing is a direct indication of the loss of phosphate mineral to waste. It is economically advantageous to control these losses at acceptable low levels without using excessive quantities of fatty acid flotation reagent. To do this, the tailing BPL content measured by the on-stream analysis system is compared to a set point, which is a predetermined acceptably low level for losses. The difference between the set point and the measured BPL represents an error to be corrected by a resultant change in the rate of fatty acid flotation reagent addition to the process as achieved by a feed back control loop. A measurement below set point results in a decrease in the fatty acid addition rate while a measurement above set point results in an increase in fatty acid addition rate.

As those skilled in the art will appreciate, the magnitude and the duration of the change is determined by many factors including the flotation characteristics of the material being processed, the dynamics of the flotation process, the on-stream analysis measurement system and the feed back control loop.

The feed back control loop consists of a controller (in this case a computer) which received the set point from an operator. In commercial operations the set point may be changed several times per day and the on-stream analysis of the BPL content of tailings can be taken every few minutes. The deviation between these values is used to calculate the rate of addition of fatty acid reagents to correct this situation. A signal representing this required reagent addition rate is then sent to a reagent flow controller which then opens or closes control valve 14 to permit the delivery of more or less reagent as measured by a reagent flowmeter.

A comparison of FIGS. 3 and 4 shows that the on-stream analysis method of the present invention allows for more precise matching of the reagent addition rate to the phosphate content of the flotation cell. This precise matching allows for more efficient use of the fatty acid reagent.

EXAMPLE 4

The percent acid-insoluble solids in a flotation concentrate stream was determined, according to the method described in Example 2, every 7.5 minutes, over a period of 525 minutes. The results are shown on the upper graph of FIG. 5.

Figure 5:
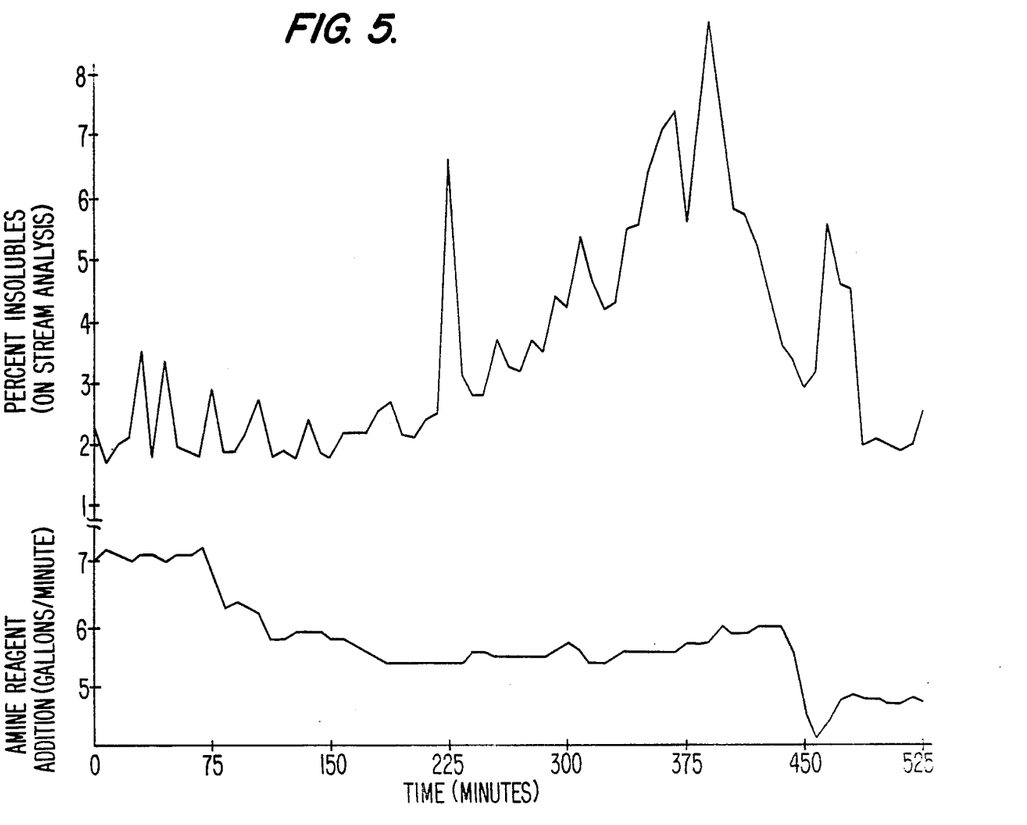
FIG. 5 presents two graphs, the upper graph showing the percent acid-insoluble solids in a cationic flotation concentrate stream over time, as determined by the on-stream measurement method and apparatus of the present invention, and the lower graph showing the rate of addition of amine reagent, under the manual control of a flotation cell operator, over the same time period.

The rate of amine reagent addition (in gallons per minute) by the operator over this time period is plotted on the lower graph of FIG. 5. The operator did not have access to the on-stream measurement of the percent acid-insoluble solids and his control of the addition of amine reagent was based upon visual inspection and laboratory assay (assays taken every two hours) over this time period.

Figure 6:
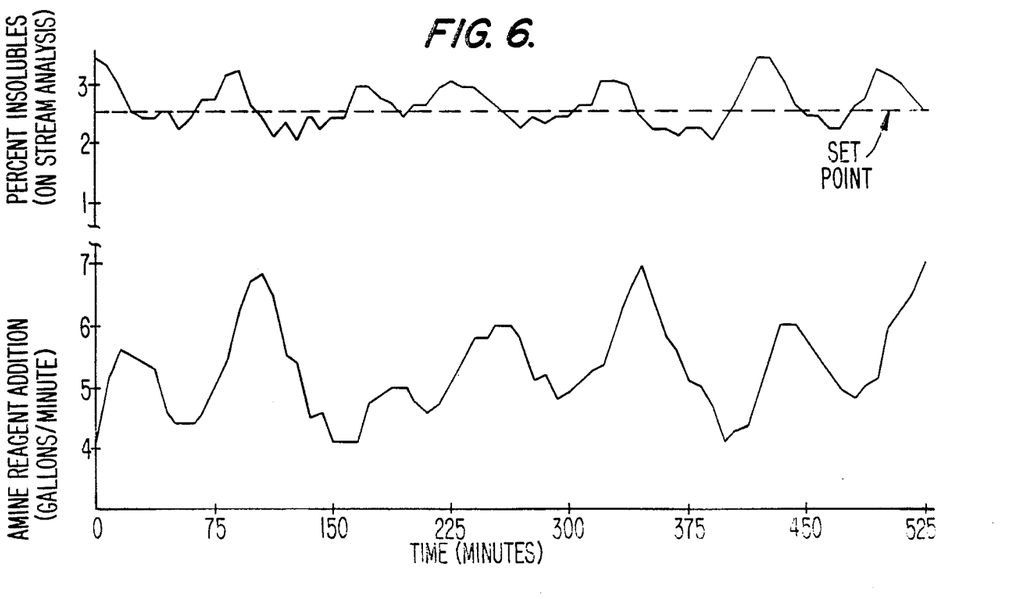
FIG. 6 presents two graphs, the upper graph showing the percent acid-insoluble solids in a cationic flotation concentrate stream over time, as determined by the on-stream measurement method and apparatus of the present invention, and the lower graph showing the rate of addition of amine reagent, under control based on a preferred on-stream measurement method of the present invention, over the same time period.

For comparison, the percent acid-insoluble solids of the same concentrate stream was determined, according to the method described in Example 2, over a different time period and the results shown in the upper graph of FIG. 6. The rate of amine reagent addition was controlled based on the measured percent acid-insoluble solids and is shown in the lower graph of FIG. 6.

The percent acid-insoluble solids contained in the cationic flotation concentrate is a direct indication of the quality of product and is directly related to its market value. It is economically advantageous to maintain this product quality at a high level without using excessive quantities of amine flotation reagent. To do this, the concentrate acid-insoluble content measured by the on-stream analysis system is compared to a set point, which is a predetermined acceptable level for quality.

In this example, the set point was 2.5% of acid-insoluble silica on a dry weight basis. The difference between the set point and the measured acid-insoluble content represents an error to be corrected by a resultant change in the rate of amine flotation reagent addition as achieved by a feed back control loop. A measurement below set point results in a decrease in the amine addition rate while a measurement above set point results in an increase in amine addition rate.

The magnitude and the duration of the change is determined by the flotation characteristics of the material being processed and the dynamics of the flotation process, the on-stream analysis measurement system and the feed back control loop.

The feed back control loop consists of a controller (in this case a computer) which receives the set point from an operator (changed several times per day) and the measured acid-insoluble solids content of the concentrate stream 16 (every 7.5 minutes). The deviation between values is used to calculate the rate of addition of amine reagents to correct this situation. A signal representing this required reagent addition rate is then sent to a reagent flow controller which then opens or closes a control valve to permit the delivery of more or less reagent as measured by a reagent flowmeter.

EXAMPLE 5

Figure 7:
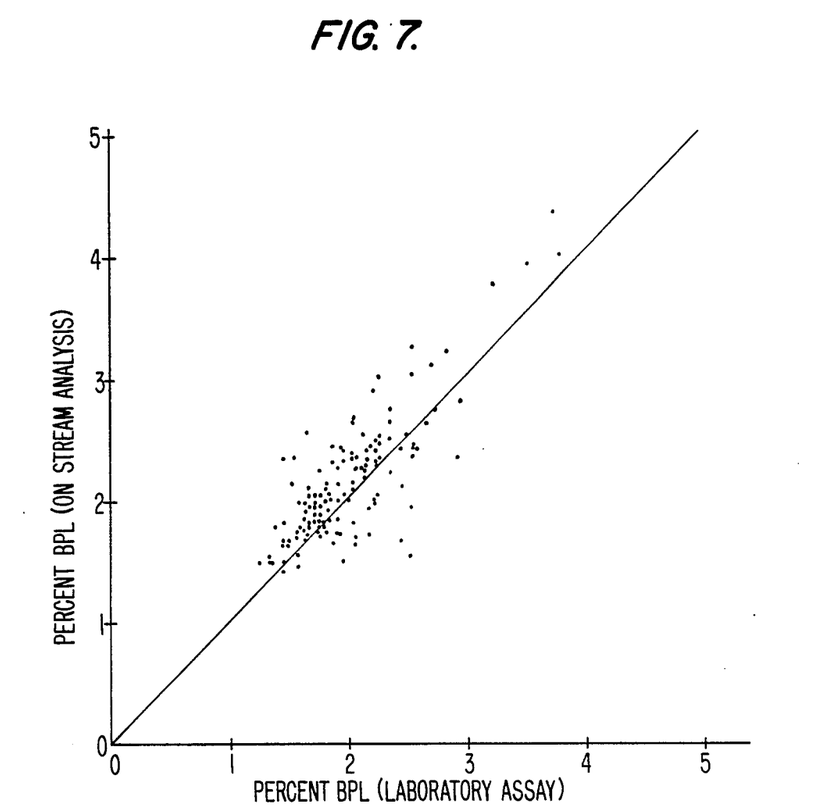
FIG. 7 is a graph comparing the percent BPL in a flotation tail stream over six days time, as measured (1) by the on-stream measurement method of the present invention and (2) by conventional laboratory assay.

A phosphate ore froth flotation tail stream was sampled once every hour over a period of about six days (140 samplings). The percent BPL on a dry weight basis of each sample was determined first, using the on-stream analysis method described in Example 1 and second, by a standard laboratory assay technique. A comparison of the on-stream analysis with the laboratory assay for each of the 140 samples is plotted in FIG. 7.

The results indicate that the on-stream analysis measurement of percent BPL was slightly higher (by a factor of 1.064) than the laboratory analysis of percent BPL for the 140 samplings. The standard error for the on-stream analyses was calculated to be 0.30 percent BPL. This is as good or better than the standard error incurred in typical laboratory analyses of percent BPL.

EXAMPLE 6

Figure 8:
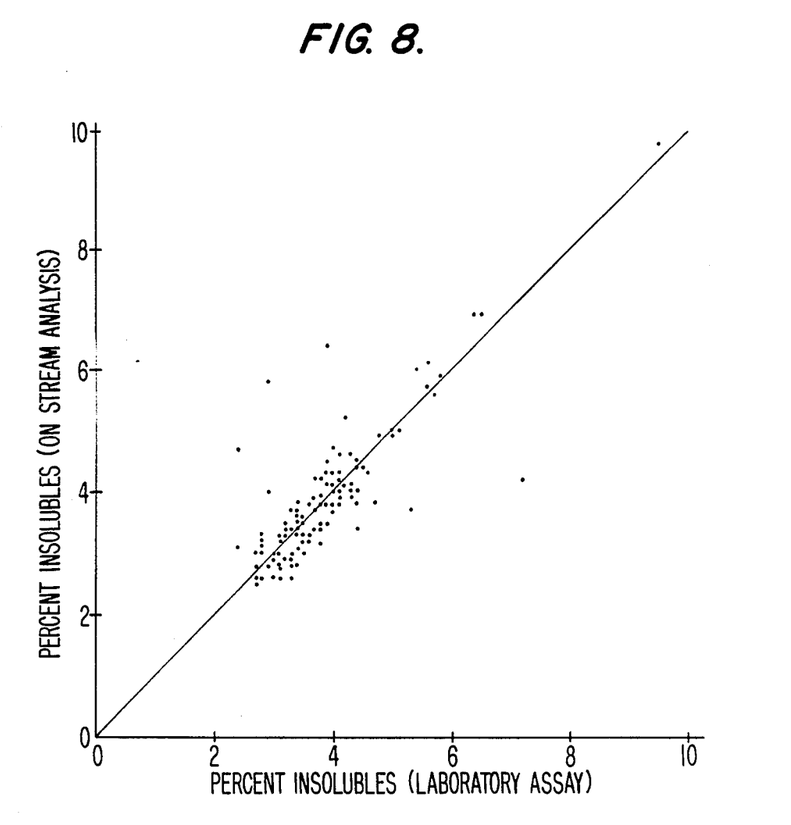
FIG. 8 is a graph comparing the percent acid-insoluble solids in a flotation concentrate stream over six days time, as measured (1) by the on-stream measurement method of the present invention and (2) by conventional laboratory assay.

A phosphate ore froth flotation concentrate stream was sampled once every hour over a period of six days (136 samplings). The percent acid-insoluble solids of each sample was determined first, by the on-stream analysis method described in Example 2 and second by a standard laboratory assay technique. A comparison of the on-stream analysis with the laboratory assay for each of the 136 samples is shown in FIG. 8.

The results indicate that the on-stream analysis measurement of percent acid-insoluble solids was slightly higher (by a factor of 1.002) than the laboratory analysis of percent acid-insoluble solids for the 136 samplings. The standard error for the on-stream analyses was calculated to be 0.59 percent acid-insoluble solids. This is about half as good as the standard error incurred in typical laboratory analyses of percent acid insoluble solids.

Numerous characteristics, advantages, and embodiments of the invention have been described in detail in the foregoing description with reference to the accompanying drawings. However, the drawings illustrate preferred embodiments of the present invention and it will be understood that the invention is not limited to the illustrated embodiments. Various changes and modifications may be effected in accordance with the teachings herein by one skilled in the art without departing from the scope and spirit of the invention. Although the use of the present invention in connection with the analysis of, and controlling the froth flotation beneficiation of, phosphate ores has been described herein, it will be appreciated by those skilled in the art that the methods and apparatus described herein can be used to determine the content of other minerals in other slurried ores, on a dry weight basis. The method of controlling the froth flotation of phosphate ore described herein can be easily applied to the froth flotation beneficiation of other ores such as fluorspar, for example.

We claim:

1. An on-stream method of measuring the content of a mineral constituent in an ore on a dry weight basis, the ore being in a flowing aqueous slurry, comprising:
    (a) selecting a target mass of ore solids to be collected and analyzed;
    (b) measuring the flow rate and density of the flowing slurry and calculating the time period necessary to collect the target mass of ore solids by diverting the flowing slurry into a vessel;
    (c) diverting the slurry flow into the vessel for the calculated time period;
    (d) measuring the flow rate and density of the diverted slurry and calculate the mass of ore solids actually collected in the vessel;
    (e) analyzing the content of the mineral constituent in the collected ore solids; and
    (f) determining the constituent content as a percentage of the collected mass of ore solids.

2. The method of claim 1, wherein said calculated time period is calculated according to the following formula:

$$t = \frac{M_{solid}}{Q_{slurry}} * \frac{1/p_{water} - 1/p_{solid}}{1/p_{water} - 1/p_{slurry}}$$

wherein:
$M_{solid}$ is the selected target mass of ore solids (g);
$Q_{slurry}$ is the measured mass flow rate of the slurry (g/sec); $P_{water}$ is the density of water (g/cm$^3$);
$P_{slurry}$ is the measured density of the slurry (g/cm$^3$);
$P_{solid}$ is the known density of the ore solids (g/cm$^3$); and
t is the period of time (sec).

3. The method of claim 1, wherein the mineral constituent is a phosphate mineral.

4. The method of claim 3, wherein the ore comprises a phosphate ore.

5. A method of controlling the beneficiation of an ore in the froth flotation of an aqueous pulp containing the ore using a flotation reagent, by on-stream measurement of the content of a mineral constituent in a selected target mass of ore on a dry weight basis, the ore being in an aqueous slurry flowing from the froth flotation, comprising:
    (a) selecting a target mass of ore solids to be collected and analyzed;
    (b) measuring the flow rate and density of the flowing surry and calculating the time period necessary to collect the target mass of ore solids by diverting the flowing slurry into a vessel;
    (c) diverting the slurry flow into the vessel for the calculated time period;
    (d) measuring the flow rate and density of the diverted slurry and calculating the mass of ore solids actually collected in the vessel;
    (e) analyzing the content of the mineral constituent in the collected ore solids;
    (f) determining the constituent content as a percentage of the collected mass of ore solids; and
    (g) adjusting the amount of flotation reagent added to the aqueous pulp in response to the determined percent.

6. The method of claim 5, wherein said calculated time period is calculated according to the following formula:

$$t = \frac{M_{solid}}{Q_{slurry}} * \frac{1/p_{water} - 1/p_{solid}}{1/p_{water} - 1/p_{slurry}}$$

wherein:
t is the period of time (sec);
$M_{solid}$ is the selected target mass of the ore (g);
$Q_{slurry}$ is the mass flow rate of the slurry (g/sec);
$P_{water}$ is the density of water (g/cm$^3$);
$P_{slurry}$ is the density of the slurry (g/cm$^3$);
$p_{solid}$ is the known density of the ore solids contained in the slurry (g/cm$^3$).

7. The method of claim 5 wherein the mineral constituent comprises a phosphate mineral.

8. The method of claim 5 wherein the ore comprises a phosphate ore.

9. The method of claim 5, wherein the aqueous slurry flowing from the froth flotation represents an average slurry composition obtained by periodically sampling a froth flotation exit stream over time.

10. The method of claim 1 or 5, wherein the analyzing step comprises a flow injection analysis.

11. Apparatus for on-stream measurement of a mineral constituent in an ore on a dry weight basis, the ore being in a flowing aqueous slurry, comprising:
    (a) means for measuring the flow rate and density of the flowing slurry and for calculating a period of time necessary to collect a selected target mass of ore solids in a vessel;
    (b) valve means for deverting the flowing slurry into said vessel, the vessel having sufficient capacity to contain the amount of slurry diverted over said period of time;
    (c) said means for measuring the flow rate and density of the flowing slurry further measures the flow rate and density of the diverted slurry;
    (d) means to calculate the mass of the ore solids actually collected in said vessel;
    (e) means for analyzing the content of the mineral constituent content in the ore solids collected in the vessel;
    (f) means to determine the constituent content as a percentage of the collected mass of ore solids.

12. Apparatus for controlling the beneficiation of an ore in the froth flotation of an aqueous pulp containing the ore using a flotation reagent, by on-stream measurement of the content of a mineral constituent in a selected target mass of ore on a dry weight basis, the ore being in an aqueous slurry flowing from the froth flotation, comprising:
    (a) means for measuring the flow rate and density of the flowing slurry and for calculating a period of time necessary to collect a selected target mass of ore solids in a vessel;

(b) valve means for diverting the flowing slurry into said vessel, the vessel having sufficient capacity to contain the amount of slurry diverted over said period of time;
(c) said means for measuring the flow rate and density of the flowing slurry further measures the flow rate and density of the diverted slurry;
(d) means to calculate the mass of the ore solids acturally collected in said vessel;
(e) means for analyzing the content of the mineral constituent content in the ore solids collected in the vessel; and
(f) means to determine the constituent content as a percentage of the collected mass of ore solids;
(g) means for adjusting the amount of flotation reagent added to the aqueous pulp in response to the determined percentage.

* * * * *

UNITED STATES PATENT AND TRADEMARK OFFICE
CERTIFICATE OF CORRECTION

PATENT NO. : 4,726,896
DATED : February 23, 1988
INVENTOR(S) : Richard D. Grove and Ronald L. Wiegel It is certified that error appears in the above-identified patent and that said Letters Patent are hereby corrected as shown below:

```
Column 1, line 55, "benefication" should read -- beneficiation --
Column 1, line 55, "floation" should read -- flotation --
Column 1, line 56, before the word "beneficiation" insert -- a --
Column 9, line 11, "degester" should read -- digester --
Column 10, line 3, "ligh" should read -- light --
Column 11, line 27, "th" should read -- the --
Column 12, line 8, "volumn" should read -- volume --
Column 12, line 66, "meaurements" should read -- measurements --
Column 13, line 34, "mg of PBL/l)" should read -- mg of BPL/l) --
Column 17, Claim 5, line 11, "surry" should read -- slurry --
Column 18, Claim 11, line 8, "deverting" should read
     -- diverting --
```

Signed and Sealed this

Sixteenth Day of August, 1988

Attest:

DONALD J. QUIGG

Attesting Officer

Commissioner of Patents and Trademarks